United States Patent [19]
Hall, II

[11] Patent Number: 5,126,923
[45] Date of Patent: Jun. 30, 1992

[54] OMNIDIRECTIONAL LIGHT

[75] Inventor: William J. Hall, II, Tampa, Fla.

[73] Assignee: Illumitech, Inc., Tampa, Fla.

[21] Appl. No.: 558,962

[22] Filed: Jul. 27, 1990

[51] Int. Cl.⁵ .............................................. F21V 21/30
[52] U.S. Cl. .................... 362/35; 362/282; 362/322
[58] Field of Search ............... 362/31, 32, 35, 277, 362/280, 281, 282, 283, 284, 319, 322, 323, 324, 346; 350/484, 258, 632, 259, 637; 116/202

[56] References Cited

U.S. PATENT DOCUMENTS

| | | | |
|---|---|---|---|
| 1,961,116 | 5/1934 | van Braam van Vloten | 362/35 |
| 3,877,171 | 4/1975 | Sloop et al. | 362/282 |
| 4,054,791 | 10/1977 | Du Shane | 362/35 |
| 4,104,615 | 8/1978 | Hunter | 362/35 |
| 4,669,817 | 6/1987 | Mori | 362/35 |

Primary Examiner—Stephen F. Husar
Attorney, Agent, or Firm—Allen, Dyer, Doppelt, Franjola & Milbrath

[57] ABSTRACT

Intense illumination is cast omnidirectionally by a single light source that directs a ligth beam onto a pair of mirrors rotating hundreds of revolutions per second. The mirrors are mounted in an "X" configuration and are thus vibration-free. The light beam is split in half and directed in opposite directions by the mirrors to enable the mirrors to rotate at half the speed of single mirror devices. The light source may be offset from the axis of rotation of the mirrors to shroud preselected areas from illumination.

13 Claims, 11 Drawing Sheets

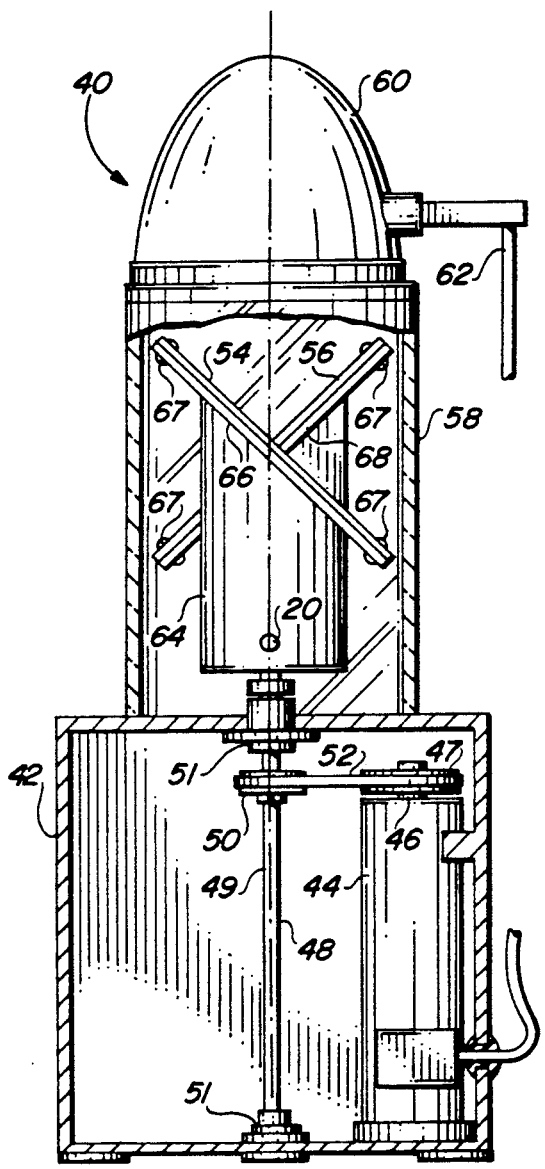
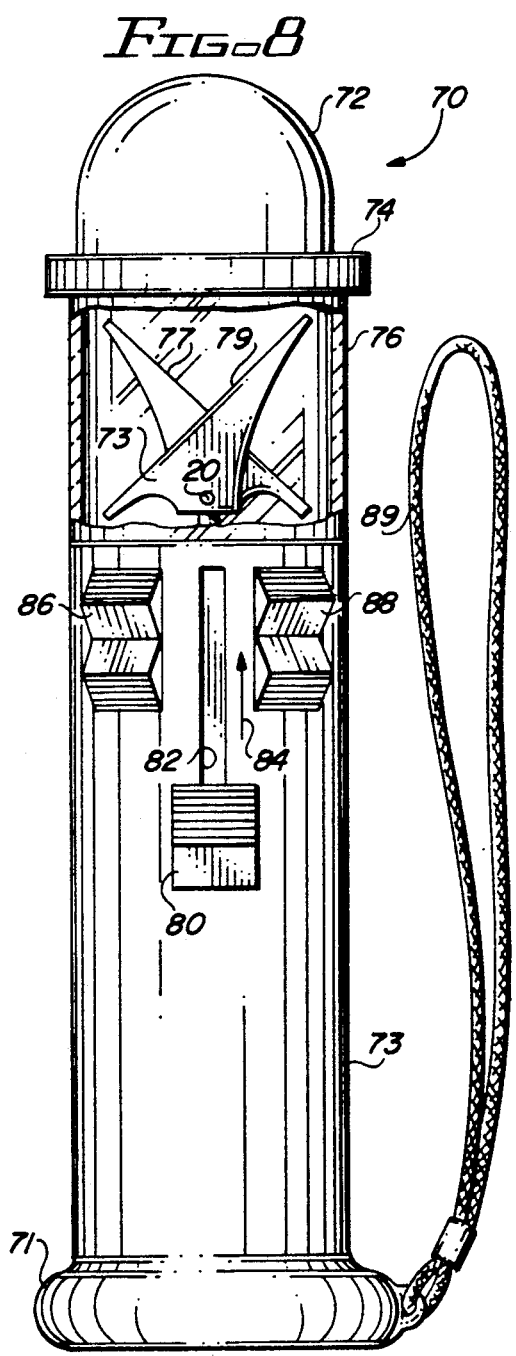

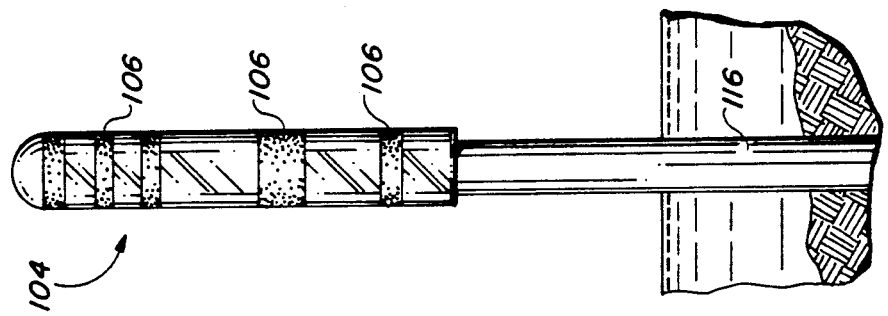
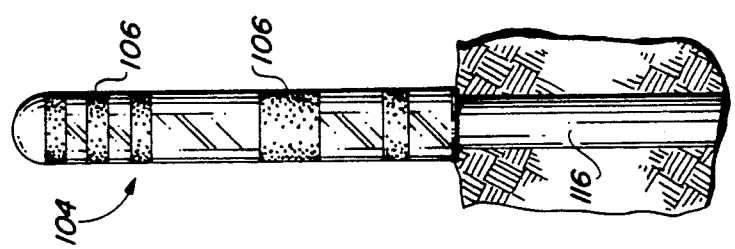
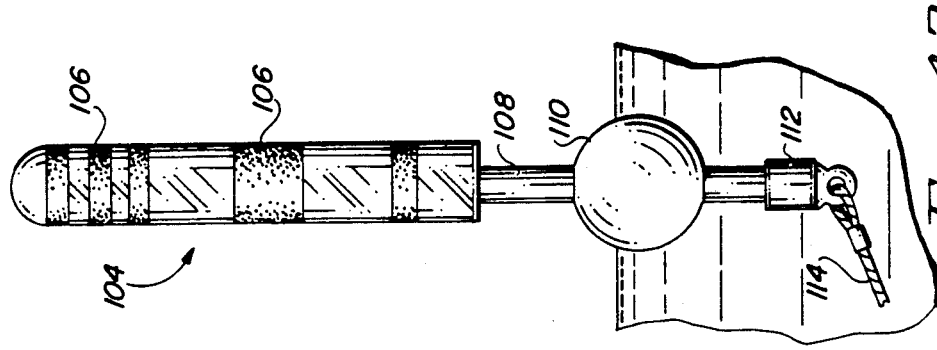
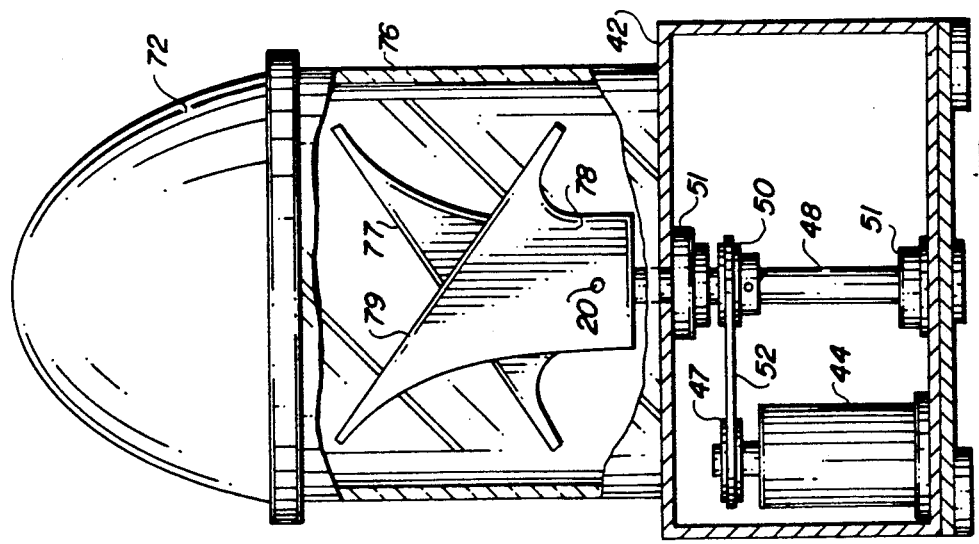

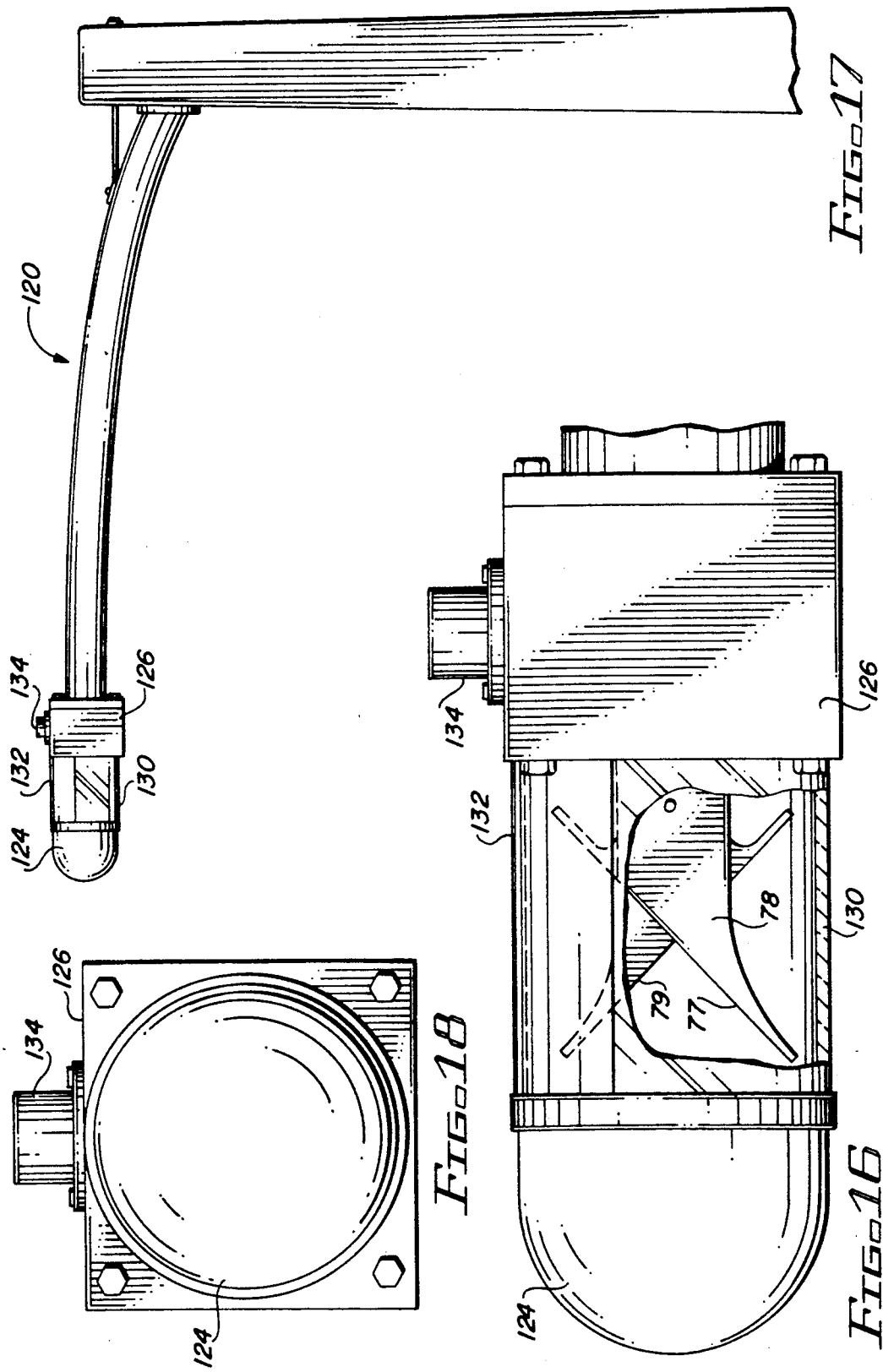

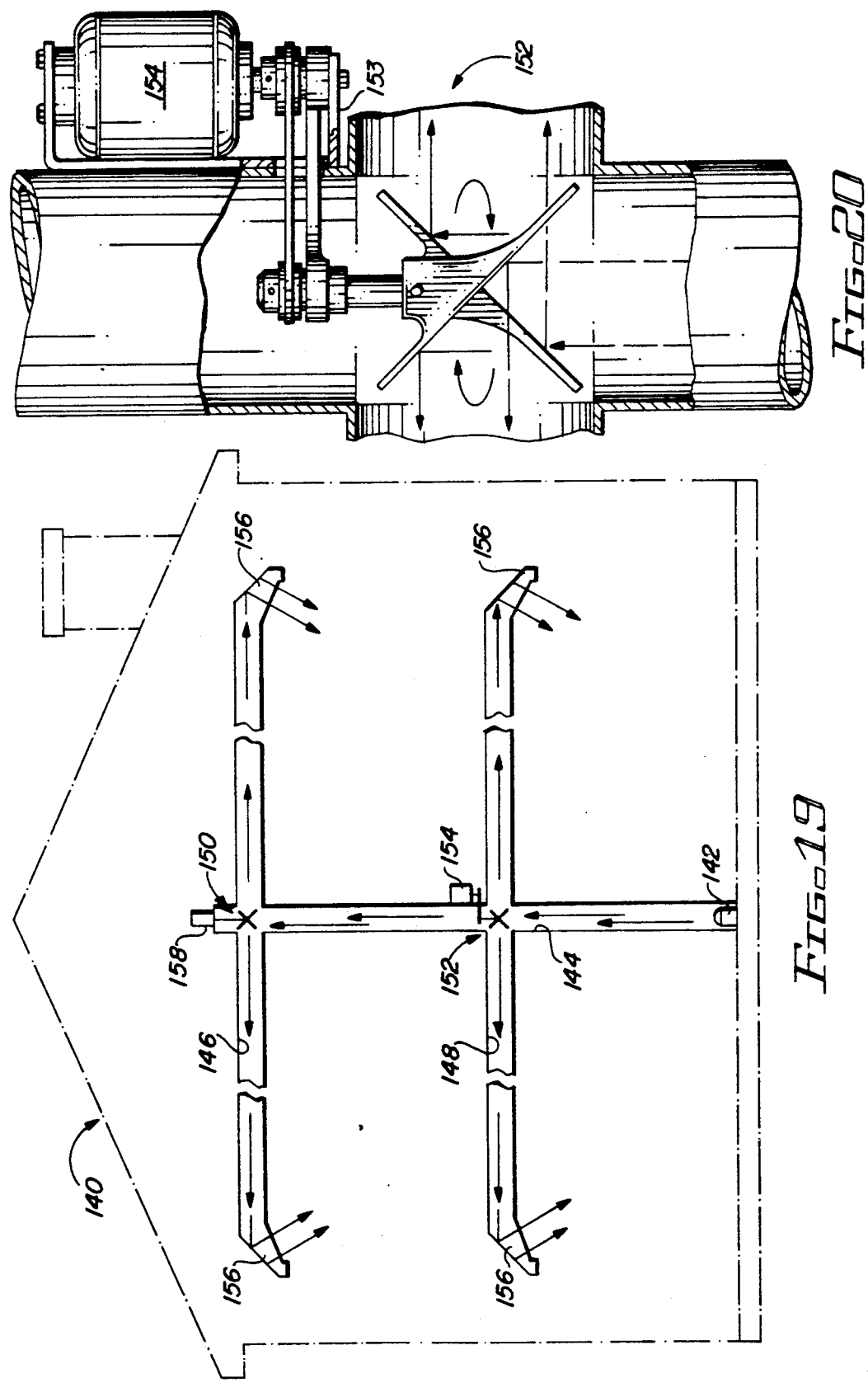

OMNIDIRECTIONAL LIGHT

TECHNICAL FIELD

This invention relates, generally, to illumination devices. More particularly, it relates to an onmidirectional light having a single, stationary light source.

BACKGROUND ART

Conventional light bulbs are omnidirectional, but their illumination is not intense beyond a short distance. In order to provide a light that would cast its illumination over greater distances, inventors developed flashlights and spotlights. These devices focus the light beam so that it travels over greater distances, but the omnidirectionality of the light is lost.

Accordingly, a number of inventors developed light fixtures having focused beams that would spin about an axis at a high rate of speed. These fast spinning lights were the first to provide omnidirectional lighting beyond the capabilities of a fixed position light source, but the mechanical forces acting upon the bulbs shortened the lifetime of such spinning bulbs and made them unacceptable.

In 1977, Du Shane was awarded U.S. Pat. No. 4,054,791 for a portable lantern having a high speed rotary beam. A mirror was mounted at a forty five degree angle relative to the vertical and spun at high speeds. The result was a fast-spinning spotlight beam that provided an intense omnidirectional light.

It has been determined, however, that a rapidly rotating mirror positioned at a forty five degree angle is subject to rotational problems because of the inherent instability of a flat, planar article mounted at a forty five degree angle. Thus, at high speeds of rotation, vibration appears and greater rotational speeds cannot be obtained.

Thus, there is a need for an omnidirectional light that is not subject to vibration-related problems, but the prior art neither teaches nor suggests how such an instrument could be provided.

DISCLOSURE OF INVENTION

The longstanding but heretofore unfulfilled need for a vibration-free omnidirectional light is now fulfilled by a light having a unique double mirror.

A high intensity lamp is positioned above the novel mirror arrangement; the center of the lamp and the axis of rotation of the novel mirror are coincident so that the light beam is split in half upon reflecting off the mirrors, with each half beam being directed into a path of travel one hundred eighty degrees opposite to its counterpart.

A first mirror is positioned at a forty five degree angle, and a second mirror is similarly positioned but its reflective surface directs light impinging thereagainst in a diametrically opposite direction relative to the light impinging on the first mirror. Thus, the two mirrors form an "X" configuration when seen in side elevation. This enables the mirrors to rotate at half the speed of a single mirror to produce the same quantity of omnidirectional illumination. Perhaps more importantly, this "X" configuration of mirrors is perfectly balanced. Accordingly, the rate of revolution can be much higher than in earlier rotating mirror lamps, with the result that the intensity of the light is appreciably greater in all directions when a similar light source is used.

It is therefore understood that the primary object of this invention is to provide an omnidirectional light having enhanced intensity over great distances.

A related object is to provide a mirror structure capable of being rotated at very high speeds.

These and other objects, features and advantages of the invention will become apparent as this description proceeds.

The invention accordingly comprises the features of constructions, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 7 is a side elevational and partially sectional view of a second embodiment of the invention;

FIG. 8 is a side elevational, partially cut away view of the third embodiment;

FIG. 12 is a side elevational, partially cut away view of a sixth embodiment;

FIG. 13 is a side elevational view of a marker buoy having utility in connection with the novel apparatus;

FIG. 14 is side elevational view of land-mounted buoy;

FIG. 15 is a side elevational view of the buoy mounted in shallow waters;

FIG. 16 is an enlarged side elevational view of an embodiment of the invention in the form of a street light;

FIG. 17 is a partial side elevational view of the street light, a part of which is enlarged in FIG. 16;

FIG. 18 is a front elevational view of the lamp part of said street light;

FIG. 19 is a side elevational view of a house equipped with still another embodiment of the present invention;

FIG. 20 is an enlarged, detailed view of the motor-driven reflectors shown in FIG. 19;

Similar reference numerals refer to similar parts throughout the several views of the drawing.

BEST MODES FOR CARRYING OUT THE INVENTION

Figure 1:
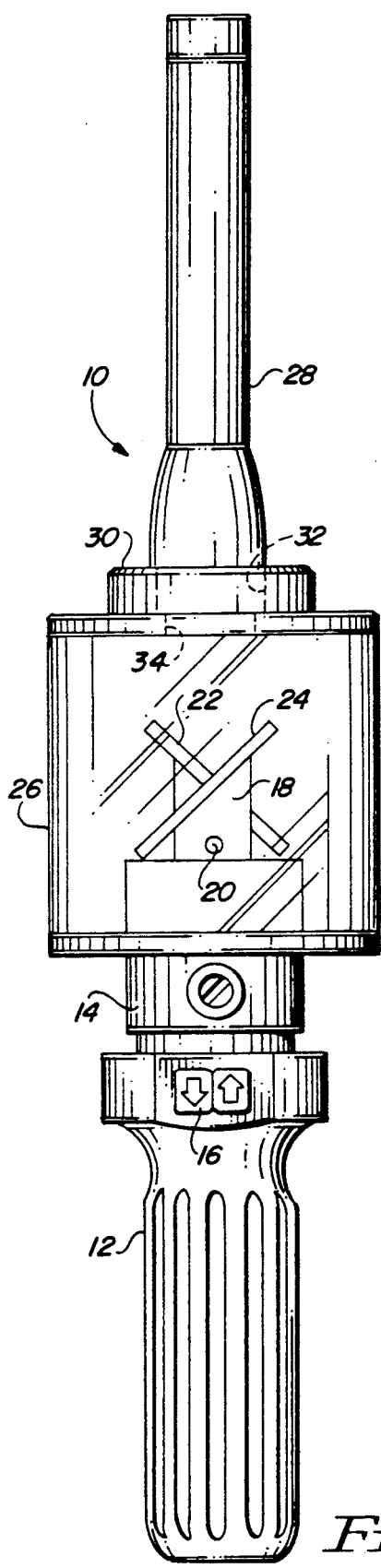
FIG. 1 is a side elevational view of a first embodiment of the invention.

Referring now to FIG. 1, it will there be seen that a hand held prototype embodiment of the present invention is denoted by the reference numeral 10 as a whole.

Device 10 includes a handle 12 of the type having a battery-operated motor 14 affixed thereto, as in power screw drivers, e.g. Activation of switch 16, having directional arrows thereon, causes the output shaft, not shown, of motor 14 to rotate in a predetermined direction dependent upon the direction of rocking of said switch as is well known.

A base member 18 of unique construction is suitably secured as at 20 to the output shaft and is therefor conjointly rotatable therewith. Base 18 has two oppositely inclined surfaces, each of which supports a mirror. More particularly mirrors 22 and 24 are disposed orthogonally with respect to one another and at forty five degrees angles relative to the axis of rotation of the output shaft.

A transparent cylindrical housing 26 keeps dust off the mirrors and does not rotate. It also serves as a mounting means for flashlight 28, as perhaps best understood in connection with FIG. 2. Flashlight 28 includes a reflector 27 and a bulb 29. A boss 30 is centrally apertured as at 32 (FIG. 1) to receive the leading end of the flashlight and housing 26 is also suitably apertured as at 34 to admit light into the housing, as indicated by the arrows collectively denoted 36 in FIG. 2.

Figure 2:
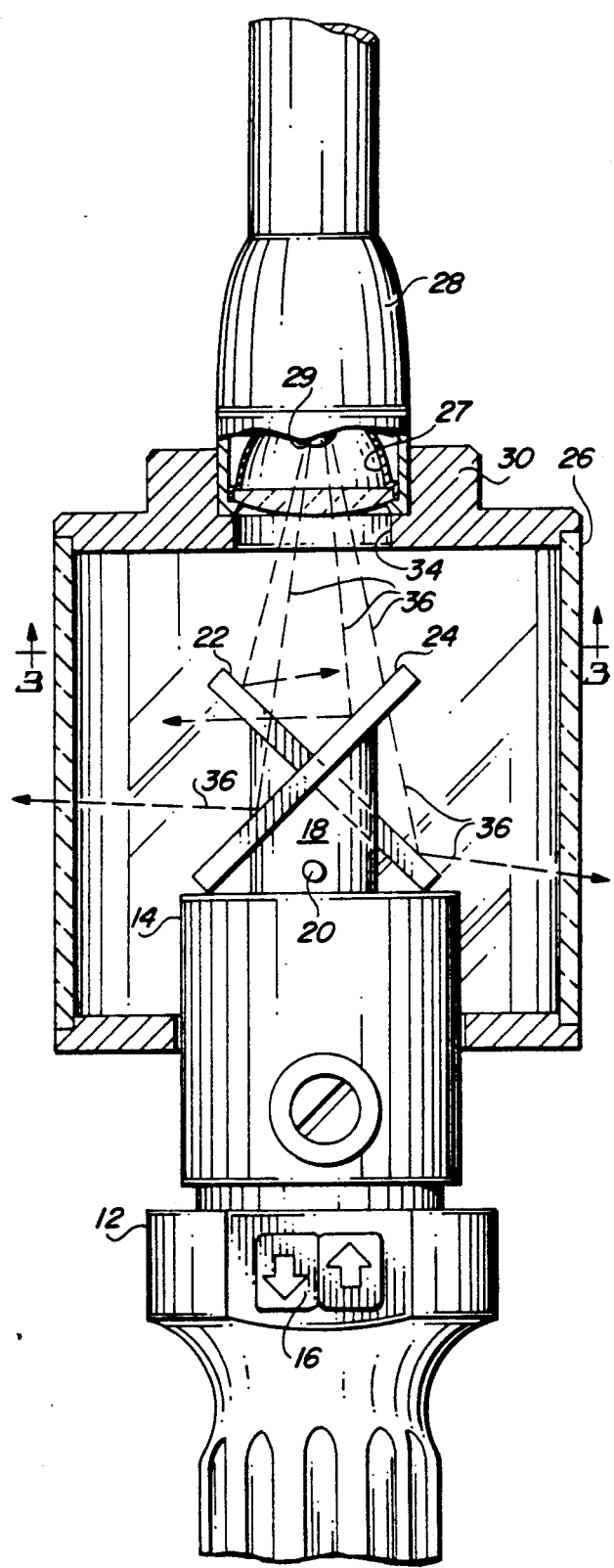
FIG. 2 is an enlarged, partially cut away view of the apparatus of FIG. 1.
Figure 3:
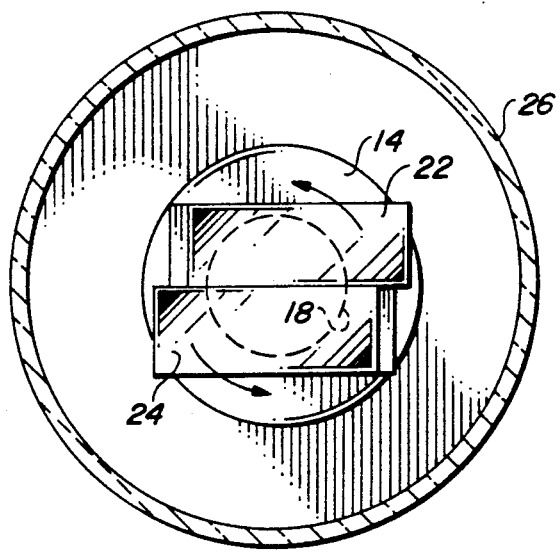
FIG. 3 is a sectional view taken along line 3—3 in FIG. 2.

It should be clear from FIG. 2 that the light beams are directed in opposite directions in a plane substantially orthogonal to the axis of symmetry of the light beam.

Figure 5:
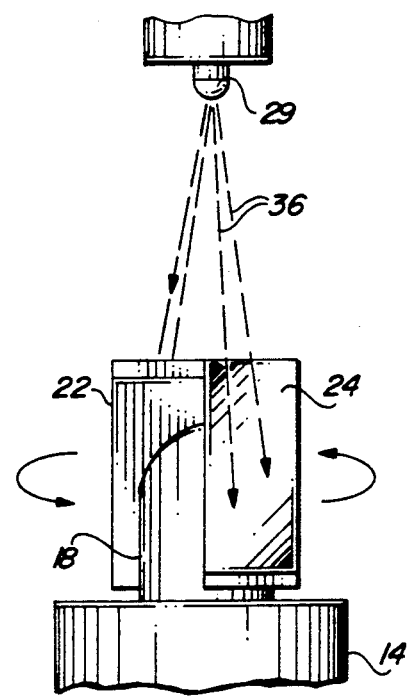
FIG. 5 is a view similar to FIG. 4, showing the mirrors in a second position of rotational adjustment.
Figure 4:
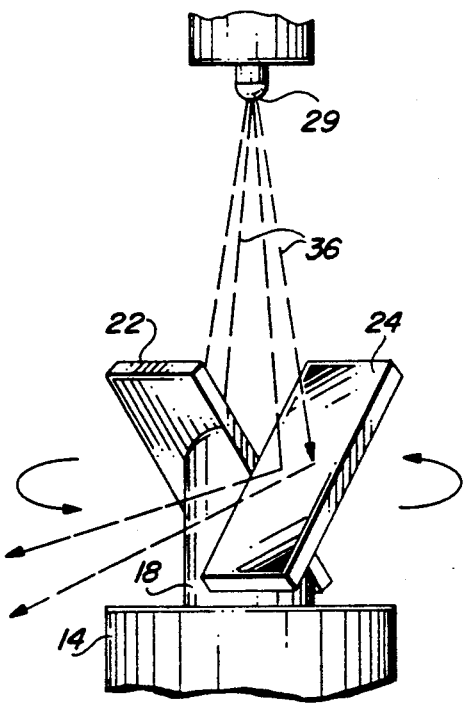
FIG. 4 is a perspective view of the novel mirrors at a selected position of rotational adjustment.
Figure 6:
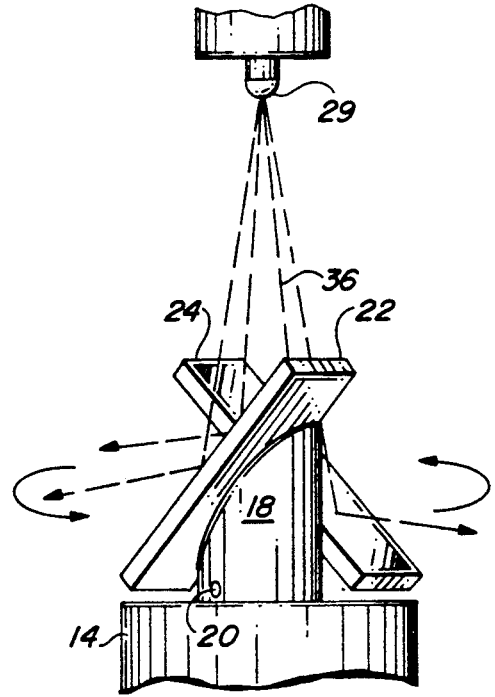
FIG. 6 is a view similar to FIGS. 4 and 5, showing the mirrors in a third selected position of rotational adjustment.

The splitting of the beam may be better understood in connection with FIGS. 3–6, where the mirrors are shown in plan view (FIG. 3) and in different rotational positions (FIGS. 4–6).

A larger and somewhat less portable prototype of the novel motion light is shown in FIG. 7 and is denoted 40 as a whole.

The embodiment of FIG. 7 includes a hollow base 42, a motor 44 mounted therewithin, motor 44 having output shaft 46 that carries pulley 47, an upstanding, rotatably mounted central axle member 48 having axis of rotation 49, a pulley 50 carried thereby, a belt 52 for interconnecting pulleys 47 and 50, pillow bearings 51, a first mirror 54, a second mirror 56, a transparent, preferably cylindrical housing 58 for said mirrors, and a high intensity lamp 60 that receives line current through cord 62.

Those skilled in the art of machine design will appreciate that there are numerous means equivalent to the depicted belt and pulley apparatus for causing vertical axle 48 to rotate about its axis 49. Various gear arrangements, direct drives, and the like could be employed, for example.

Moreover, housing 58 need not be cylindrical in configuration and may instead take any predetermined geometrical configuration. It need not be provided at all if no care is taken to keep mirrors 54, 56 clean.

Lamp 60 is preferably a zenon gas filament or short arc light sources which are commercially available from a variety of manufacturers.

Mirrors 54, 56 are mounted on base 64 that is conjointly rotatable with axle 48. Base 64 includes first flat surface 66 that is disposed at a forty five degree angle relative to axis 49 and second flat surface 68 that is disposed orthogonally to said first surface 66, i.e., it is also disposed forty five degrees relative to axis 49 but is sloped in an opposite direction relative to said first surface 66.

Mirrors 54, 56 are fixedly secured to their respective mounting surfaces 66, 68 by any suitable means such as screws 67.

Light emanating from lamp 60 is split by mirrors 54, 56 into two equal intensity beams, just as in the first embodiment.

Both Motor 44 and lamp 60 operate on 12 volts; accordingly, this embodiment may be used in a variety of mobile applications including marine, auto and aircraft or for all types of stationary exterior or stand alone interior lighting applications. Motor 44 rotates at 1,800 R.P.M.s under load and has a gear ratio of 1 to 2, thereby rotating axle 48 and the mirrors at 3,600 R.P.M. However, the novel arrangement of mirrors doubles the number of light pulses and thus has an effective rotational speed of 7,200 R.P.M. or 120 revolutions per second. Thus, the human eye is unable to perceive any discontinuities in the illumination.

When light source 60 is a six million candle power unit, this embodiment will illuminate over three square miles (1,920 square acres) at nearly the same intensity, in any one degree of the beam's 360 degrees of travel. The area illuminated is over one thousand times that of the unaided light source 60 and the lighting efficiency is nearly six hundred and fifty times that of said light source.

Another portable version of the novel motion lamp is depicted in FIG. 8 and is denoted 70 as a whole. A bulb and a reflector are housed in dome 72. Threaded flange 74, having a O-ring seal (not shown), joins dome 72 and transparent, cylindrical housing 76. Base 78 in this embodiment is a molded, one-piece plastic part. A vacuum-applied reflective coating is applied to the respective angled surfaces 77, 79 thereof.

A red-tinted shroud, shown in its retracted configuration, is attached to and conjointly movable with slide knob 80 that slides back and forth in slot 82 when manipulated by the operator of the novel light. Accordingly, sliding knob 80 in the direction of arrow 84 raises the shroud so that the light reflected off surfaces 77, 79 may be given a red tint if desired.

Switch 86 is an on/off switch and switch 88 controls the direction of rotation of the mirrors. Carrying strap 89 is optional.

Note that the bottom 71 of handle 73 is widened to enable storage of the unit in an upright configuration as shown.

Figure 9:
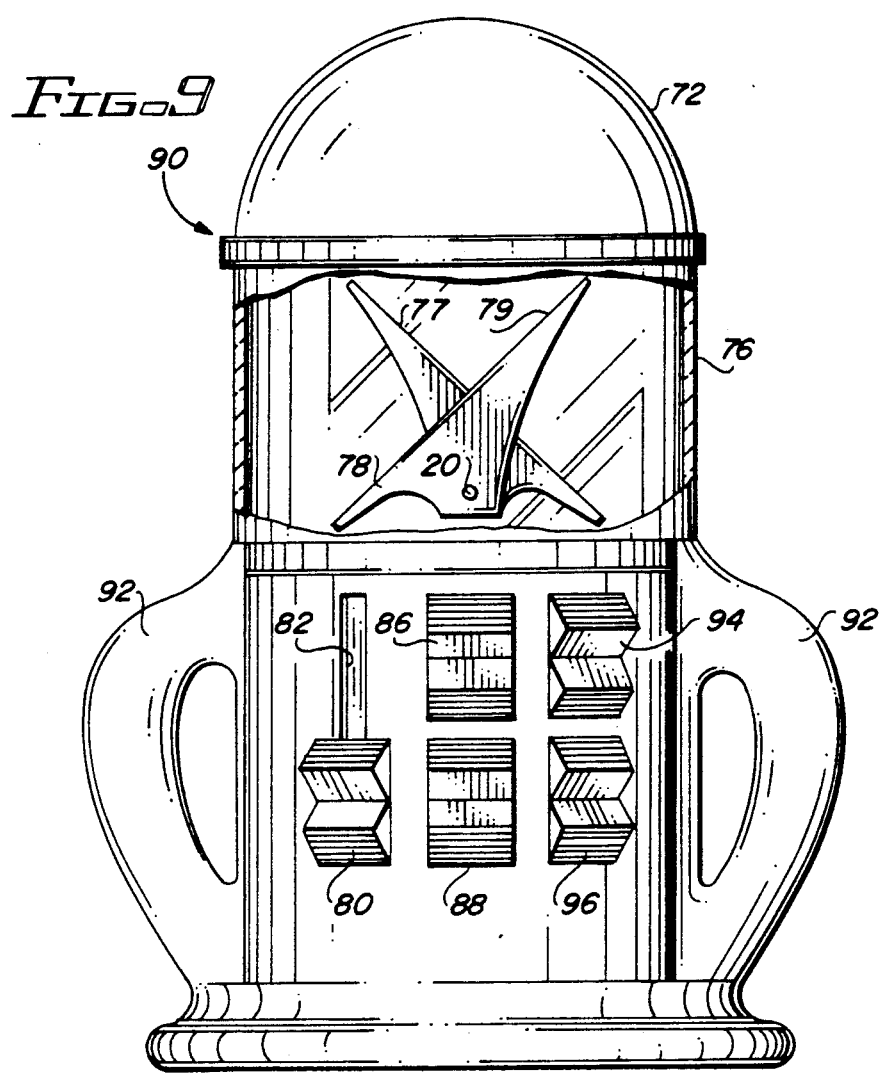
FIG. 9 is a side elevational, partially cut away view of a fourth embodiment.

A portable lantern 90 that incorporates the teachings of this invention is shown in FIG. 9. Since this embodiment is similar to the embodiment of FIG. 8, similar reference numerals are applied to parts common to both Figs. Lantern 90 includes a pair of handles 92 and couple of switches 94, 96 that were not depicted in FIG. 8; switch 94 is an emergency mode switch and switch 96 is a vertical beam reflector switch. The reflector means in this embodiment is also a vacuum-applied reflective coating; such a coating can be employed in lieu of conventional mirrors in all other embodiments as well.

Figure 10:
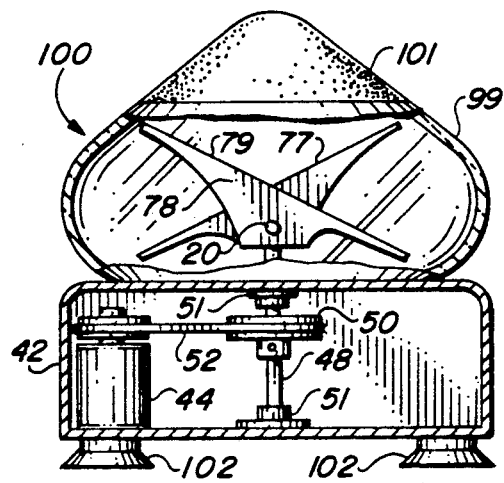
FIG. 10 is side elevational, partially cut away view of a fifth embodiment with the mirrors in a first position of rotational adjustment.
Figure 11:
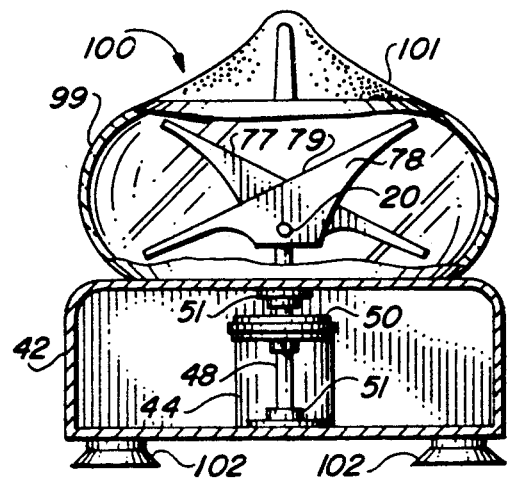
FIG. 11 is a view similar to FIG. 10, but showing the mirrors rotated one hundred and eighty degrees from the FIG. 10 position.

A pleasure or sport boat model 100 of the novel lighting system appears in FIGS. 10 and 11. A bulb and a reflector are positioned within opaque housing 101. Note the bulbous transparent housing 99 and suction cups 102 which facilitate mounting of this model on pleasure craft.

A larger, commercial version of a marine lighting system appears in FIG. 12. The same reference numerals are applied to FIG. 12 as used in FIGS. 7-11 to indicate corresponding parts.

FIG. 13 shows a cylindrical sea-mounted marker buoy 104 having white, red and green reflectors, collectively denoted 106, applied thereto. Buoy 104 in FIG. 13 includes a corrosion-free shaft 108 because it is intended for use in salt water environments. Float 110 includes ballast; the numeral 112 indicates the counter-ballast, and 114 denotes a stainless steel cable that extends to a permanent anchor.

FIGS. 14 and 15 show land-based pylons 116; FIG. 14 shows the pylon mounted on land and FIG. 15 shows the pylon mounted in shallow water. In all three usages, the marker is illuminated by a lamp constructed in accordance with the teachings and suggestions made herein.

FIGS. 16-18 show a street lamp 120 that employs the novel mirror arrangement. The light source, including reflector and bulb, is housed in housing 124 and the reference numeral 126 indicates the motor that rotates the molded one piece plastic base 78 having reflective surfaces 77, 79. Part 130 is a clear plastic shroud and part 132 is an opaque reflector that reflects the light toward the area sought to be illuminated. 134 is a conventional photo cell timer.

FIG. 19 shows a two-story house 140 every room of which is illuminated by a single light source 142 shown at the bottom of a light tunnel or transmission tube 144, although it should be understood that said light source could be at the top of such tube or at another preselected location. Branch light transmission tubes 146 (second floor) and 148 (first floor) carry reflected light to the various rooms of the house. The rotary reflector for the second floor is denoted 150 as a whole and the rotary reflector for the first floor is denoted 152.

FIG. 20 shows that a belt drive motor 154 may be employed to rotate reflector 152; mounting bracket 153 is also depicted. Note that a direct drive motor 158 may be employed to rotate the upper reflector 150 (FIG. 19).

Light emission prisms, collectively denoted 156, are positioned at the end of each light tunnel 146, 148, as shown in FIG. 19.

Figure 21:
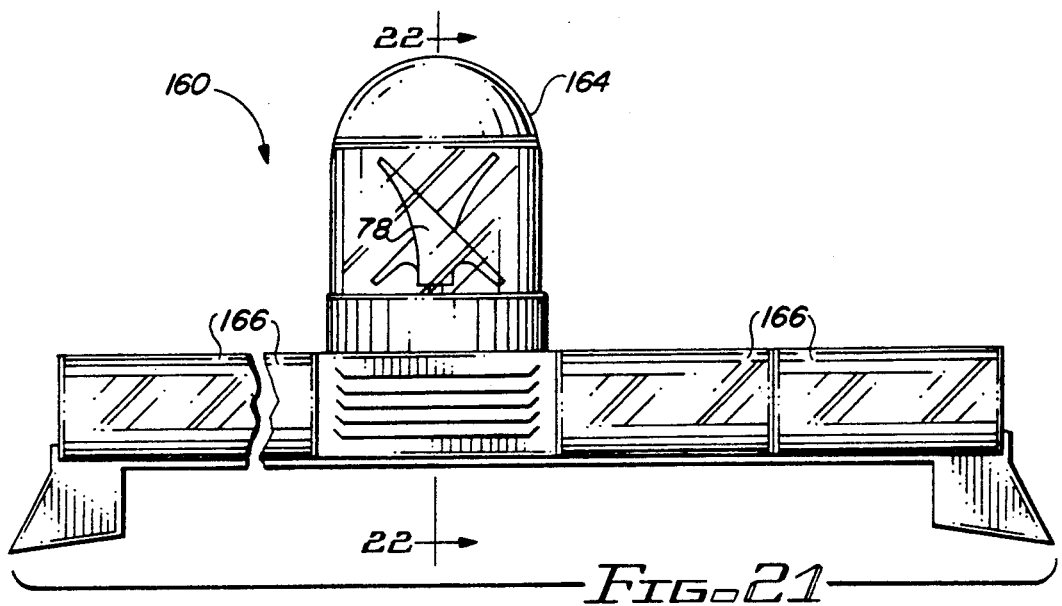
FIG. 21 is a front elevational view of a police car light fixture.
Figure 22:
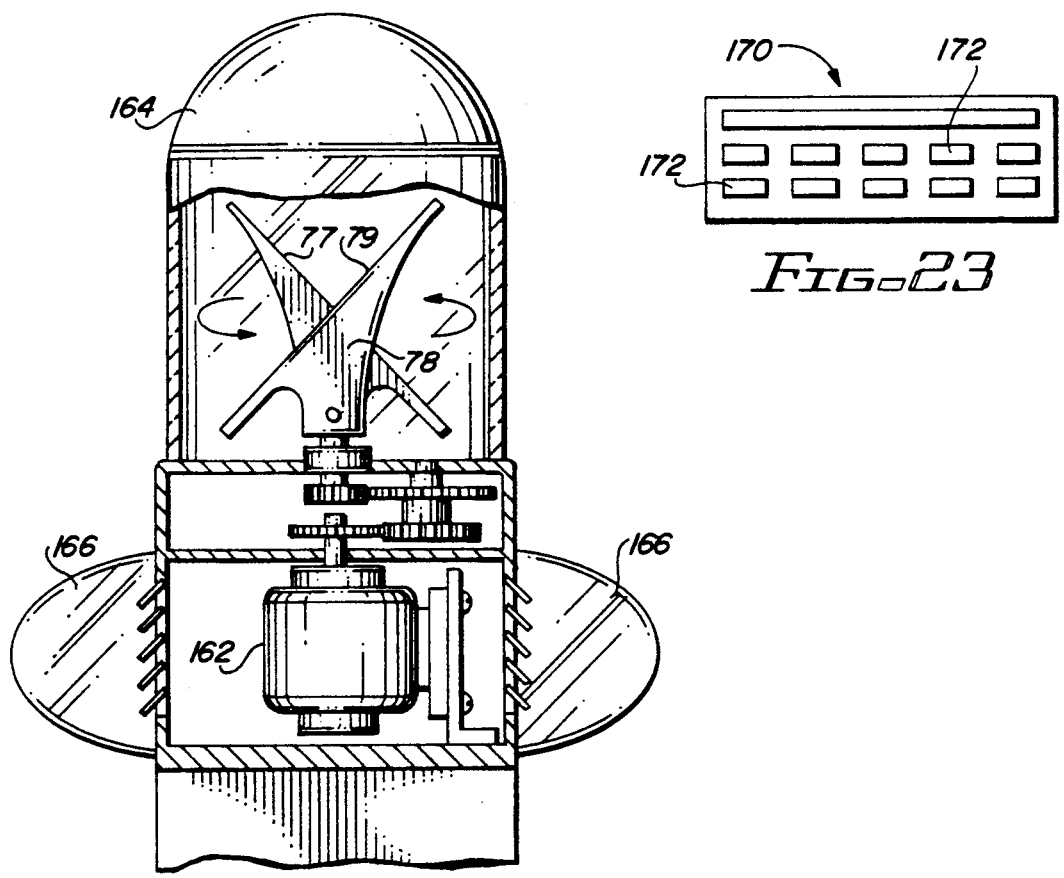
FIG. 22 is a sectional view taken along line 22—22 in FIG. 21.
Figure 23:
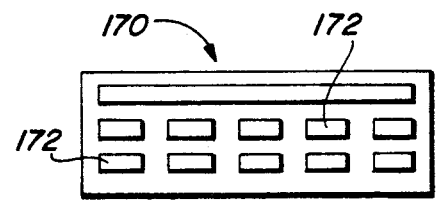
FIG. 23 is an elevational view of a remote control pad having utility in connection with all embodiments of the present invention.
Figure 24:
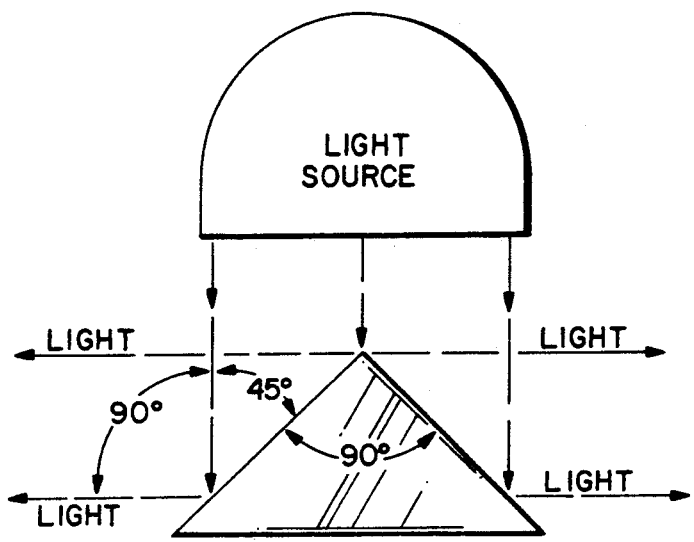
FIGS. 24–38 show prisms having utility in connection with the several embodiments of the invention.
Figure 25:
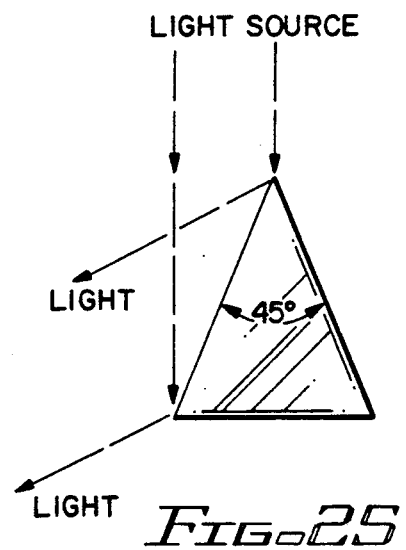
Figure 26:
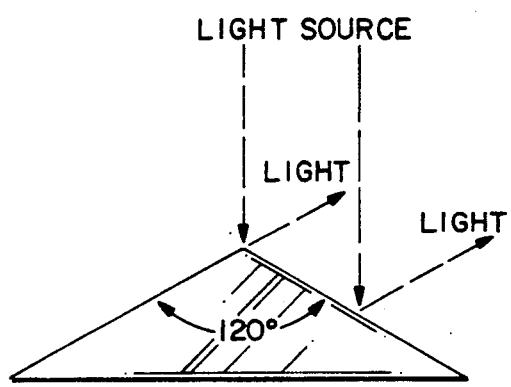
Figure 27:
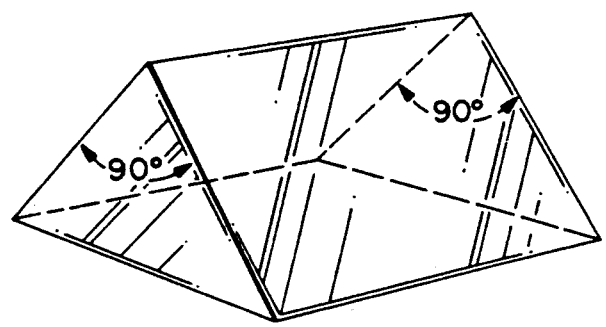
Figure 28:
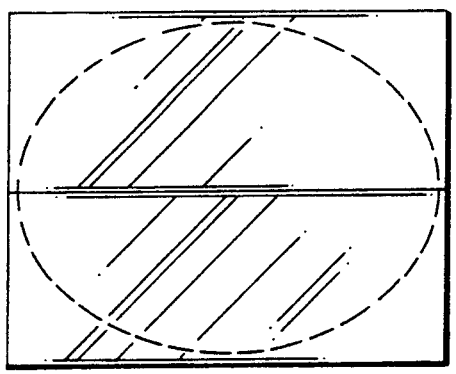
Figure 29:
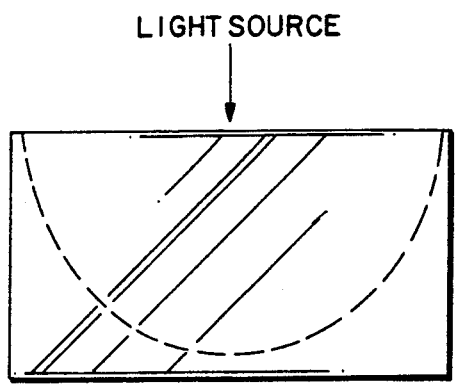
Figure 30:
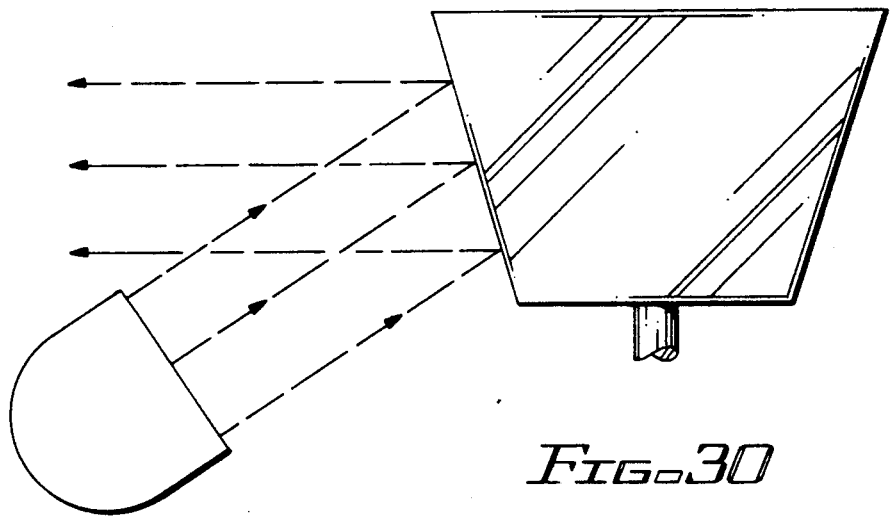
Figure 31:
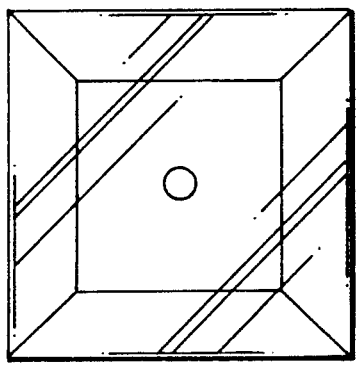
Figure 32:
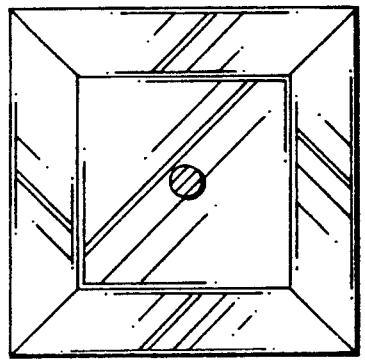
Figure 33:
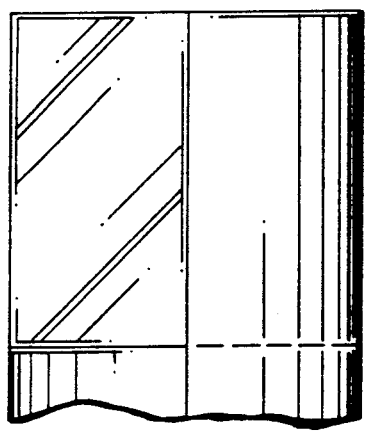
Figure 34:
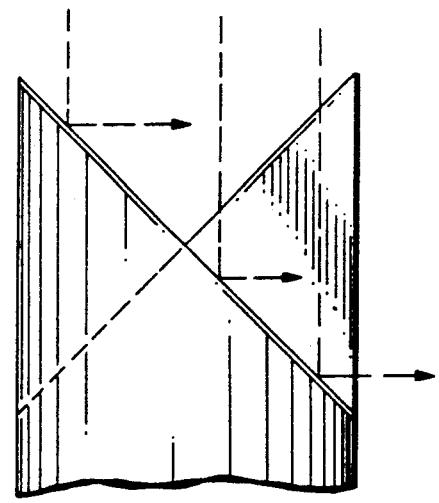
Figure 35:
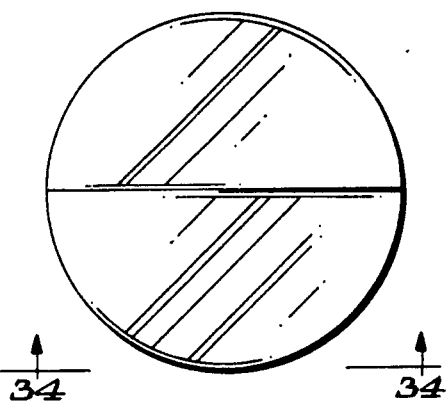
Figure 36:
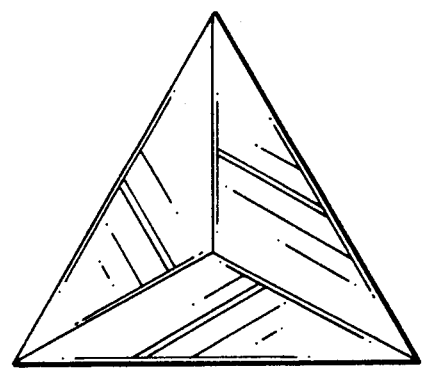
Figure 37:
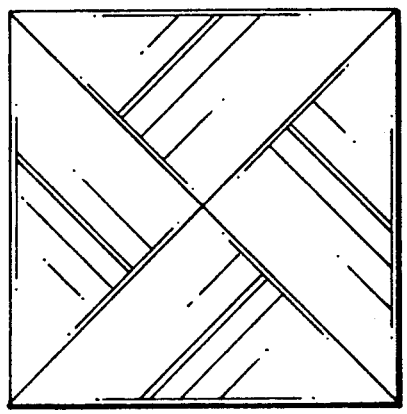
Figure 38:
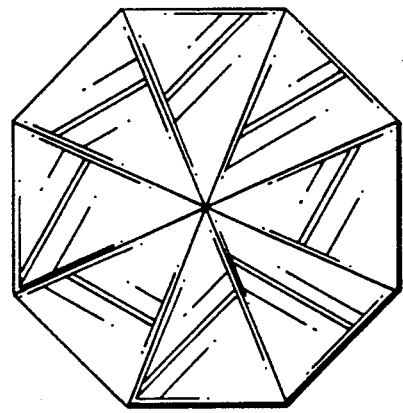

A police squad car light that incorporates the inventive teachings is shown in FIGS. 21 and 22 and is denoted 160 as a whole. Motor 162, shown in FIG. 22, rotates the one piece molded base 78; the light source is housed in dome 164. Lights 166 are conventional A remote control pad 170, shown in FIG. 23, includes keys 172 that, when activated, control the various functions of the novel structure. For example, one key may simply activate the source of electromagnetic radiation, another key may effect rotation of the mirrors or reflectors in a first direction, another key may raise or lower a tinted shroud, another key may place the lamp in its emergency mode, and so on. Remote activation is accomplished through conventional transmitting and receiving means.

The remaining FIGS. (24-38) show prisms of the type having utility in connection with the structure-lighting system of FIG. 19. The prisms can also be used in lieu of mirrors and other reflecting surfaces in all other embodiments as well. A prism having four sides need rotate at only one-fourth the speed of a single-sided reflector to produce the same amount of reflected illumination. The speed of rotation is thus inversely proportional to the number of reflecting surfaces, i.e., where N = the number of reflecting surfaces, the speed of rotation required to produce an equal amount of light over an equal area at equal source intensifies is equal to 1/N.

It was mentioned earlier that the light source is in axial alignment with the output shaft of the motor that rotates the mirrors or reflectors. However, another important teaching of this invention is that the lamp may be eccentrically aligned as well. Interestingly, as the source of electromagnetic radiation is offset from its axial alignment with the rotational axis of the mirrors, surrounding areas that had been illuminated fall into darkness if not otherwise illuminated. As the amount of offset increases, the angular sweep of the illuminating beam is decreased, i.e., preselected areas may be shrouded from illumination by selecting the amount of offset between the axis of symmetry of the light source and the axis of rotation of the mirrors.

It should be understood that the novel light can be portable or stationary as requirements dictate. Moreover, the axis of rotation of the mirrors need not be vertical as depicted. The axis of rotation may be horizontal or any preselected angle between the vertical and horizontal. Due to the high speed of rotation and the phenomenon known as persistence of vision, the illuminated area will appear to be continuously illuminated. The illumination will of course be achieved in the plane of the reflected beam's travel, i.e., when the axis of rotation is vertical, the beam will travel in a horizontal plane. The brightest part of the reflected light beam will always be angled ninety degrees relative to the axis of rotation of the mirrors and the two light beams will always be one hundred eighty degrees opposed to one another.

The speed of rotation of the mirrors may be preselected to as low as ten revolutions per second, and as high as one hundred fifty revolutions per second or even higher. The device operates vibration-free because it is inherently balanced, i.e., its "X" configuration is an aerodynamically optimal design. This high speed rotation is not possible in the prior art designs due to their inherent structural imbalance. The speed of rotation is so high in the novel light that no flicker is visible, i.e., the illuminated area seems to be under truly continuous illumination. Thus, even a speeding automobile is easily detected. Very high speed automobiles can escape detection under the flickering illumination of prior art lights.

The high speed of rotation also insures that each area of illumination will be brightly illuminated. When examining the illumination of a three hundred sixty degree circular area, for example, a light meter shows that the peak intensity of light in each one degree area of illumination is the same and is substantially equal to the illumination that is provided by a fixed beam of the same intensity. A slight, but negligible loss in intensity may arise if the transparent part of the housing 28 is not perfectly clear and optically coated or if the mirror surfaces are not perfectly reflective and clean.

To achieve the same results, a single mirror would have to rotate twice as fast as the novel opposing mirrors of this invention for any given level of illumination. However, prior art mirrors, being unbalanced, cannot achieve the rotational speeds of the present invention. Theoretically, however, if prior art mirrors could reach sufficient rotational speed to achieve the unflickering, intense illumination achieved by the present device, such mirrors would require at least twice the energy input as the novel device. Thus, the ability to rotate at half the speed of a prior art lamp to provide the same quantity and quality of illumination is an important energy-saving feature of this invention.

Although the mirrors of this invention have been depicted as being flat, other configurations for such mirrors are within the scope of this invention. For example, the reflective surfaces could be convex or concave if an application were to require more diffuse or more concentrated lighting, respectively. Compound reflective surfaces are also within the scope of this invention, as are diffuse, specular, and the like and any combination thereof.

In addition, contemplated solar assisted and solar powered exterior lighting systems including marine, roads and parking applications as well as solar assisted and solar powered interior lighting systems including integrated and stand alone applications are well within the scope of this invention. These solar powered applications will utilize various solar cells, panels and other collection devices.

Those skilled in the art of optics will also appreciate that prisms, crystals, lenses, optical fibers, fluids and the like could be employed to enhance light transmission, amplification and reflection and all such embellishments are within the contemplation and scope of this invention, as a matter of law.

Those of such skill will also readily appreciate that the light source need not be restricted to the visible light region of the electromagnetic spectrum. For example, some applications may call for the "illumination" of an area by infrared or ultraviolet radiation. Other applications might even call for the reflection of radiation from the remaining regions of the spectrum, and all such usages of the inventive structure are clearly within the scope of this invention.

The light source may be of the conventional incandescent or fluorescent type, or numerous other types such as halogen, xenon, sodium vapor, neon, solar, laser, infrared and the like. Accordingly, the claims that follow refer to the light source in a generic sense, i.e., as a source of electromagnetic radiation.

This invention is clearly new and useful. Moreover it was not obvious to those of ordinary skill in the art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An illumination device, comprising:
  a source of electromagnetic radiation emitting light, said source emitting light along a preselected axis;
  a first reflector having a reflective surface in a first plane and disposed at a first predetermined degree angle relative to said preselected axis;
  a second reflector having a reflective surface in a second plane and disposed at a second predetermined degree angle relative to said preselected axis;
  said first and second reflectors being disposed adjacent to a longitudinal axis and said longitudinal axis being the axis of rotation of said reflectors;
  said first and second plane intersecting along a line that divides into two parts the reflective surface of the first reflector; and
  means for rotating said reflectors about said longitudinal axis to split light radiation emitted by said source into two different directions and broadcast the split light omnidirectionally when said reflectors are rotated, and for rotating said reflectors about said longitudinal axis at a speed where the human eye is unable to perceive discontinuities in the split light.

2. The device of claim 1, wherein said line bisects the reflective surface of the second reflector.

3. The device of claim 1, further comprising a transparent housing for said reflectors.

4. The device of claim 3, wherein said housing is cylindrical.

5. The device of claim 1, further comprising an opaque shroud for blocking transmission of radiation in a preselected direction.

6. The device of claim 5, wherein said opaque shroud includes a reflector means for enhancing the illumination of a preselected area.

7. An illumination device, comprising:
  a source of electromagnetic radiation;
  a first mirror having a reflective surface disposed at a forty five degree angle relative to a preselected axis;
  a second mirror having a reflective surface disposed at an angle that is disposed ninety degrees from said first mirror, said second mirror being positioned at a forty five degree angle relative to said preselected axis;
  a cylindrical transport housing for said mirrors;
  said source having a longitudinal axis of symmetry;
  said first and second mirrors being symmetrically disposed relative to said longitudinal axis of symmetry and said longitudinal axis of symmetry being the axis of rotation of said mirrors;
  means for rotating said mirrors about said preselected axis to split;
  whereby light emitted by said source is split into two opposite directions and broadcast omnidirectionally when said mirrors are rotated; and
  said source being movably mounted so that it may be offset from said preselected axis to thereby shroud preselected areas from illumination.

8. An omnidirectional radiating apparatus comprising:
  a source of electromagnetic radiation emitting radiation along a preselected axis;

a first reflector having a reflective surface disposed at a first predetermined degree angle relative to said preselected axis;

a second reflector having a reflective surface disposed at a second predetermined degree angle relative to said preselected axis;

said first and second reflectors being disposed adjacent to a longitudinal axis and said longitudinal axis being the axis of rotation of said reflectors;

means for rotating said reflectors about said longitudinal axis to split said radiation into two directions and broadcast the split radiation omnidirectionally when said reflectors are rotated; and said preselected axis being offset from said longitudinal axis to shroud preselected areas from the omnidirectional broadcast.

9. The omnidirectional radiating apparatus as recited in claim 8 wherein said first and second predetermined angles are between 0° and 90° with respect to said longitudinal axis.

10. The omnidirectional radiating apparatus as recited in claim 8 wherein said first and second reflectors are symmetrical relative to said longitudinal axis.

11. The omnidirectional radiating apparatus as recited in claim 8 further comprising means for adjusting the amount of offset between said longitudinal axis and said preselected axis.

12. An illumination device, comprising:

a source of electromagnetic radiation emitting light, said source emitting light along a preselected axis;

a first reflector having a reflective surface disposed at a first predetermined degree angle relative to said preselected axis;

a second reflector having a reflective surface disposed at a second predetermined degree angle relative to said preselected axis;

said first and second reflectors being disposed adjacent to a longitudinal axis and said longitudinal axis being the axis of rotation of said reflectors;

said reflective surfaces of said first and second reflectors having juxtaposed edges that extend along an elongated line running substantially perpendicular to one of said axes; and means for rotating said reflectors about said longitudinal axis to split light radiation emitted by said source into two different directions and broadcast the split light omnidirectionally when said reflectors are rotated, and for rotating said reflectors about said longitudinal axis at a speed where the human eye is unable to perceive discontinuities in the split light.

13. The illumination device as recited in claim 12 wherein said edges along said line span outwardly in two directions from one of said axes.

* * * * *